United States Patent [19]

Umetsu et al.

[11] Patent Number: 4,955,084

[45] Date of Patent: Sep. 4, 1990

[54] PAGING RECEIVER WITH METALLIC DISPLAY FRAME STRUCTURE INCREASING ANTENNA GAIN

[75] Inventors: Shinjiro Umetsu; Toshihiro Mori, both of Tokyo, Japan

[73] Assignee: NEC Corporation, Japan

[21] Appl. No.: 317,748

[22] Filed: Mar. 2, 1989

[30] Foreign Application Priority Data

Mar. 4, 1988 [JP] Japan .................................. 63-52175

[51] Int. Cl.[5] .......................... H04B 1/08; H04B 1/10

[52] U.S. Cl. .................................... 455/278; 455/347; 455/351; 343/702

[58] Field of Search ............... 343/702, 788, 841, 842, 343/872; 455/209, 278, 351, 154, 346, 347; 340/311.1, 825.44, 825.48

[56] References Cited

U.S. PATENT DOCUMENTS 4,491,978 1/1985 Nagaton et al. .................... 455/351
4,701,763 10/1987 Yamamoto et al. ................ 343/702
4,814,776 4/1989 Caci et al. ........................... 343/702

*Primary Examiner*—Benedict V. Safourek
*Assistant Examiner*—Ralph Smith
*Attorney, Agent, or Firm*—Ostrolenk, Faber, Gerb & Soffen

[57] ABSTRACT

A paging receiver having a display prevents the gain of an antenna from being lowered despite that a metal frame which fixes a display in place is located in close proximity to and in parallel with the antenna. A part of the metal frame which is close to the antenna is removed.

4 Claims, 4 Drawing Sheets

PAGING RECEIVER WITH METALLIC DISPLAY FRAME STRUCTURE INCREASING ANTENNA GAIN

BACKGROUND OF THE INVENTION

The present invention relates to a paging receiver having a display and, more particularly, to a receiver with a display in which a frame made of metal for fixing a display in place is configured to prevent the gain of an antenna from being lowered despite the metal frame is located in close proximity to the antenna.

A modern paging receiver with a display has various advanced functions and has a miniature, handy configuration. The miniature design of this kind of paging receiver is accomplished by arranging various elements of the receiver close to each other in a dense configuration. For example, an antenna and a frame for fixing a liquid crystal display (LCD) or similar display element are usually positioned in close proximity to each other. Since the frame is generally made of stainless steel, or phosphor bronze or similar metal to have great mechanical strength, the metal frame close to the antenna is apt to lower the antenna gain and thereby the sensitivity of the receiver. Therefore, when the metal frame and other members made of metal are positioned in the vicinity of the antenna, there has to be provided some implementation for preventing the antenna gain from being lowered.

SUMMARY OF THE INVENTION

It is therefore an object of the present invention to provide a paging receiver having a display that eliminates the decrease in antenna gain ascribable to various structural elements that are located close to an antenna.

It is another object of the present invention to provide a paging receiver with a display that allows a metal frame for fixing a display element to be positioned in close proximity to an antenna without inviting a decrease in antenna gain.

It is another object of the present invention to provide a generally-improved paging receiver having a display.

In accordance with the present invention, in a receiver comprising a loop antenna, a metallic structural element of the receiver that is located in close proximity to and in parallel with the antenna is provided, and at least a part of the metallic structural element which is close to the antenna is removed.

Further, in accordance with the present invention, in a receiver comprising at least a display, a metallic frame for fixing the display in place, and an antenna, the display and antenna are positioned in close proximity to each other, and at least a part of the frame which is close to the antenna is removed.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

To better understand the present invention, a prior art paging receiver with a display and the reason why the antenna gain is lowered when a metal frame for fixing a display is located close to an antenna will be described with reference to FIGS. 1A, 1B and 2.

Figure 1A:
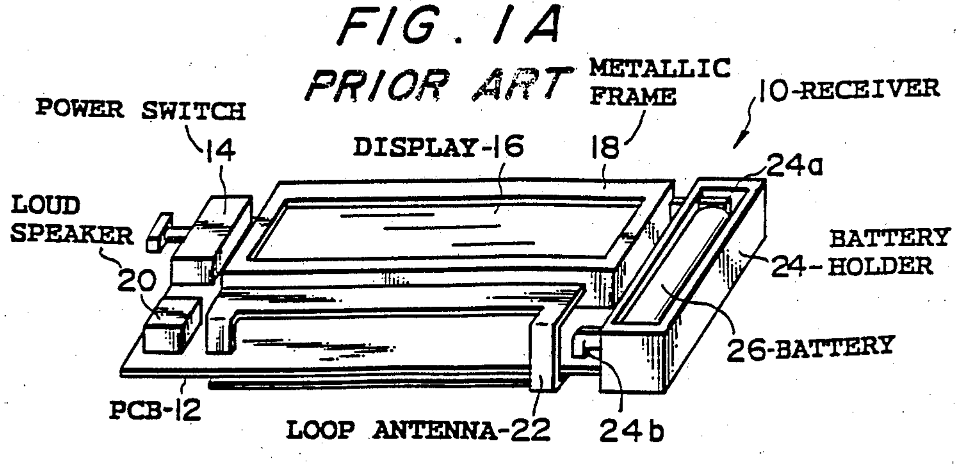
FIG. 1A PRIOR ART
FIG. 1A is a perspective view of a body portion of a prior art paging receiver having a display, a casing and a cover of the paging receiver being omitted for clarity.
Figure 1B:
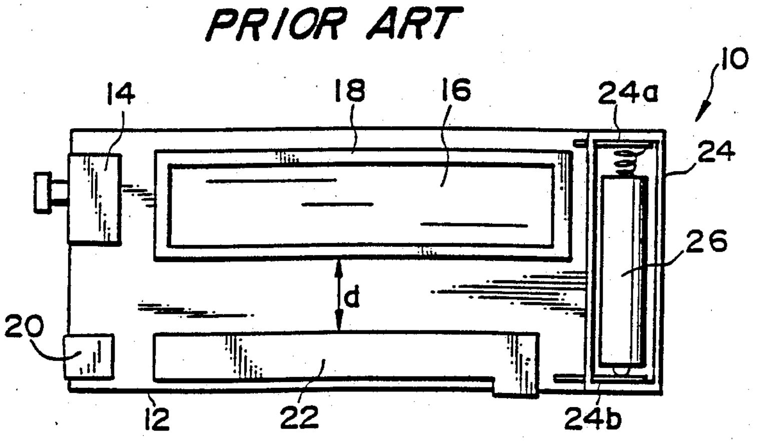
FIG. 1B PRIOR ART
FIG. 1B is a plan view of the paging receiver body portion shown in FIG. 1A.
Figure 2:
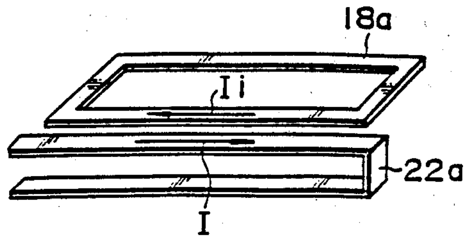
FIG. 2 is a view useful for understanding why the antenna gain is lowered.

Referring to FIGS. 1A and 1B, a body of a prior art paging receiver 10 includes a printed circuit board 12 which is loaded with various structural elements of the receiver 10. Specifically, a power switch 14, an LCD or similar display 16, a metal frame 18, a loudspeaker 20 and an antenna 22 are arranged on the printed circuit board 12. The frame 18 is made of stainless steel, phosphor bronze or similar metal and adapted to fix the display 16 in place. A box-like battery holder 24 has terminals 24*a* and 24*b* and is located in the vicinity of the printed circuit board 12 to accommodate a battery 26 therein.

The display 16 is securely retained by the metal frame 18, which is in turn located in close proximity to and substantially in parallel with the antenna 22. In such an arrangement, the frame 18 lowers the gain of the antenna 22 and thereby reduces the sensitivity of the receiver 10.

Why the arrangement shown in FIGS. 1A and 1B lowers the antenna gain will be discussed with reference to FIG. 2. As shown, when a metal frame 18*a* is positioned close to and in parallel with an antenna element 22*a*, a current Ii is induced in the metal frame 18*a* by a current I which flows through the antenna element 22*a*. The mirror current Ii is opposite in direction to the current I as illustrated and is, therefore, generally referred to as a mirror current. The resulting magnetic fluxes cancel each other due to the adjoining antenna element 22*a* and frame 18*a*, resulting in the decrease in antenna gain.

In the light of the above, it is a common practice to increase the distance d between the antenna 22 and the metal frame 18 as far as possible, or to arrange the antenna 22 and metal frame 18 in a non-parallel position. This imposes restrictions on the arrangement of the various structural elements to thereby obstruct the miniaturization of a paging receiver, while limiting the design freedom with respect to appearance.

Figure 3:
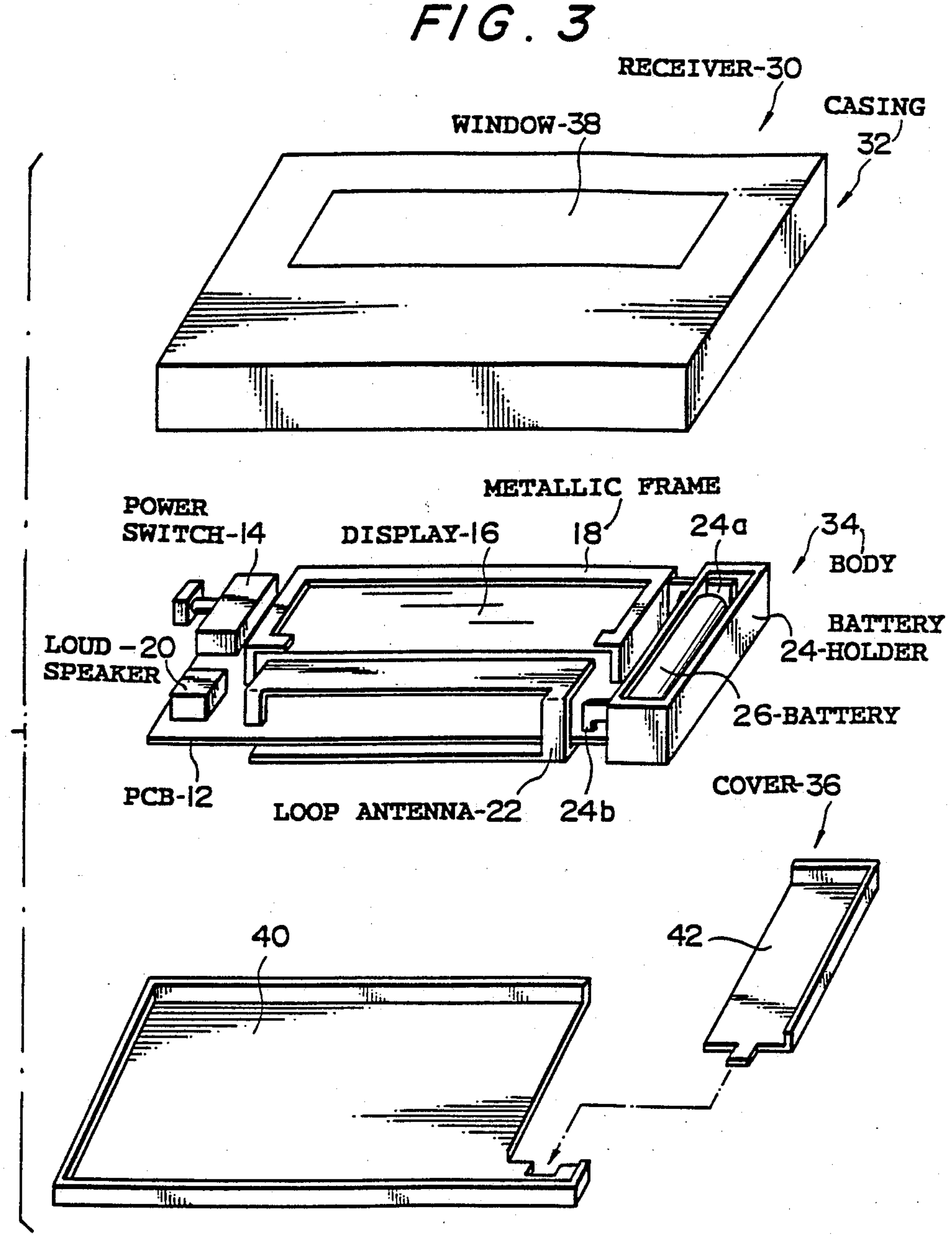
FIG. 3 is an exploded perspective view of a paging receiver having a display embodying the present invention.

Referring to FIG. 3, a paging receiver having a display embodying the present invention is shown and generally designated by the reference numeral 30. In the figure, the same or similar structural elements as those shown in FIGS. 1A and 1B are designated by like reference numerals. As shown, the receiver 30 is generally made up of a casing 32, a body 34 and a cover 36. The body 34 of the receiver 30 is shown in a plan view in FIG. 4 and in elevations in FIGS. 5A to 5D. As shown in FIG. 3, the casing 32 is provided with an opening or window 38 for display. The cover 36 is composed of a cover member 40 and a battery cover member 42.

Figure 4:
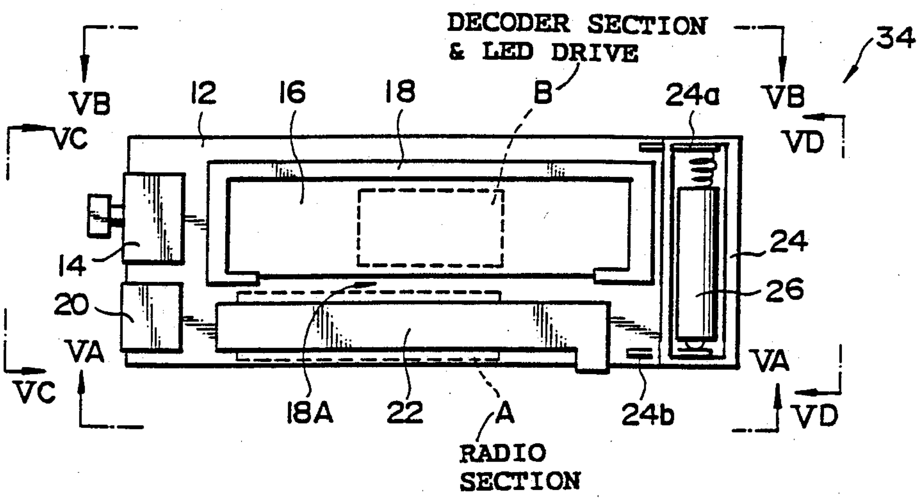
FIG. 4 is a plan view of a body portion of the paging receiver shown in FIG. 3.
Figure 5A:
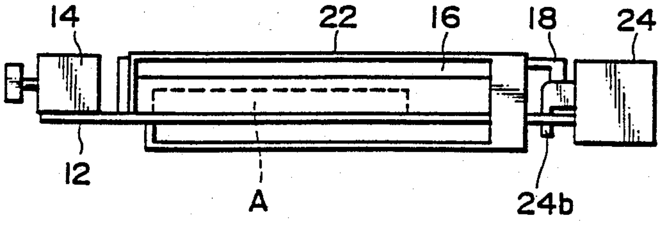
FIG. 5A is a front view as seen in a direction VA—VA of FIG. 4.
Figure 5B:
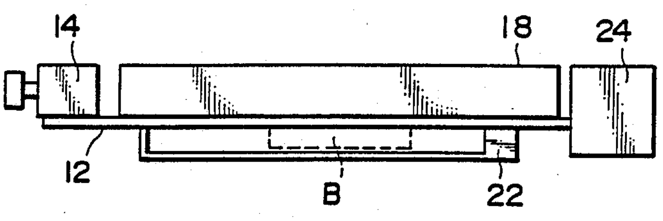
FIG. 5B is a rear view as seen in a direction VB—VB of FIG. 4.
Figure 5C:
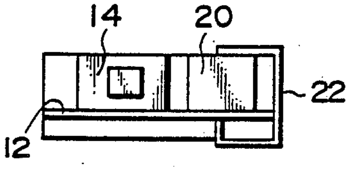
FIG. 5C is a side elevation as seen in a direction VC—VC of FIG. 4.
Figure 5D:
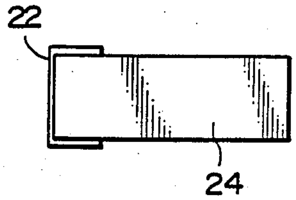
FIG. 5D is a side elevation as seen in a direction VD—VD of FIG. 4.

The body 34 of the receiver 30 will be described in detail with reference to FIGS. 4 and 5A to 5D. The body 34 includes a printed circuit board 12 on which are mounted a power switch 14, an LCD or similar display 16 for displaying a message or similar received information, a frame 18 made of stainless steel, phosphor bronze or similar metal and adapted to fix the display 16, a loudspeaker 20 for alerting a person to an incoming call, and a loop antenna 22 for efficiently converting an electromagnetic wave into an electric signal and feeding the electric signal to a high frequency circuit. Located in the vicinity of the printed circuit board 12 is a battery holder 24 which accommodates a battery 26 therein and has terminals 24*a* and 24*b* for connecting the battery 26 to the printed circuit board 12. In FIGS. 5A and 5B, a radio section is labeled A while a decoder section and an LCD drive section which serves as a display are generally labeled B. The radio section amplifies, frequency-converts, and demodulates a high frequency signal coming in through the antenna 22, delivering the resulting received signal to the decoder section. In response, the decoder section feeds information to be displayed on the LCD drive section according to the received signal, and the LCD drive section drives the LCD 16 to display the information.

As stated above, the frame 18 of the illustrative embodiment is made of stainless steel, phosphor bronze or similar metal to have sufficient mechanical strength and to enhance dense arrangement of various structural elements and, as in the prior art, it is located in close proximity to and in parallel with the antenna 22. In the illustrative embodiment, as shown in FIG. 4, a part 18A of the frame 18 is removed in order to eliminate the decrease in antenna gain otherwise caused by the above arrangement. Since the metal frame portion 18A which would effect the antenna 22 is absent, a current flowing through the antenna 22 does not induce an undesirable mirror current and, therefore, the antenna gain is prevented from being lowered.

While the battery holder 24 has been shown and described as extending perpendicularly to the antenna 24, the present invention is of course applicable to a paging receiver with a display wherein the battery holder 24 is located in parallel with the antenna 22.

It is to be noted that the present invention is applicable not only to a frame for fixing a display but also to other various structural elements which are apt to lower the antenna gain.

In summary, it will be seen that the present invention provides a paging receiver with a display in which a metal frame located in close proximity to and in parallel with an antenna is provided with a unique configuration to insure high sensitivity and great mechanical strength of the receiver. In addition, the positional relationship between the antenna and a display is freed from severe restrictions so that the design freedom with respect to appearance is enhanced.

Various modifications will become possible for those skilled in the art after receiving the teachings of the present disclosure without departing from the scope thereof.

What is claimed is:

1. A receiver comprising:

a loop antenna;

a plurality of elements for processing a signal received by said antenna; and a metallic member for structurally supporting at least one of said elements, said metallic member having a generally-rectilinear portion located generally in parallel with a longitudinal axis of said loop antenna;

said metallic member further having a portion adjacent to said loop antenna, said adjacent portion including a gap of sufficient size to substantially prevent loss of gain of said antenna resulting from mirror current in said metallic member induced by current in said antenna.

2. A receiver as defined in claim 1, wherein said receiver comprises a paging receiver.

3. A receiver comprising:

a loop antenna;

a display device for displaying information received by said antenna; and a metallic member for structurally supporting said display device, said metallic member having a generally-rectilinear portion located generally in parallel with a longitudinal axis of said loop antenna;

said metallic member further having a portion adjacent to said loop antenna, said adjacent portion including a gap of sufficient size to substantially prevent loss of gain of said antenna resulting from mirror current in said metallic member induced by current in said antenna.

4. A receiver as defined in claim 3, wherein said receiver comprises a paging receiver.

* * * * *